US010542537B2

(12) United States Patent
Kim et al.

(10) Patent No.: US 10,542,537 B2
(45) Date of Patent: Jan. 21, 2020

(54) HIGH SPEED MOVING TERMINAL AND METHOD FOR TRANSMITTING CONTROL INFORMATION THEREOF, AND METHOD FOR RECEIVING CONTROL INFORMATION OF BASE STATION IN MOBILE WIRELESS BACKHAUL NETWORK

(71) Applicant: ELECTRONICS AND TELECOMMUNICATIONS RESEARCH INSTITUTE, Daejeon (KR)

(72) Inventors: Junhyeong Kim, Daejeon (KR); Bing Hui, Daejeon (KR); Il Gyu Kim, Chungcheongbuk-do (KR); Jun Hwan Lee, Seoul (KR); Hoon Lee, Daejeon (KR); Hee Sang Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 143 days.

(21) Appl. No.: 15/652,488

(22) Filed: Jul. 18, 2017

(65) Prior Publication Data
US 2018/0027555 A1 Jan. 25, 2018

(30) Foreign Application Priority Data
Jul. 19, 2016 (KR) ........................ 10-2016-0091640

(51) Int. Cl.
*H04W 72/04* (2009.01)
*H04L 5/00* (2006.01)
(Continued)

(52) U.S. Cl.
CPC ....... *H04W 72/0446* (2013.01); *H04L 5/0048* (2013.01); *H04W 72/042* (2013.01);
(Continued)

(58) Field of Classification Search
CPC .................................................. H04W 72/0446
See application file for complete search history.

(56) References Cited

U.S. PATENT DOCUMENTS 9,137,804 B2 * 9/2015 Lin ..................... H04W 72/048
9,723,593 B2 * 8/2017 Suzuki .................. H04L 1/1851
(Continued)

FOREIGN PATENT DOCUMENTS

KR    10-2014-0050666 A    4/2014

OTHER PUBLICATIONS

Ericsson, ST-Ericsson, "Support of half-duplex operations in aggregation of TDD carriers with different UL/DL configurations", 3GPP TSG-RAN WG1 #69, R1-121989, Prague, Czech Republic, May 21-25, 2012.

*Primary Examiner* — Andrew Lai
*Assistant Examiner* — Andrew C Lee
(74) *Attorney, Agent, or Firm* — LRK Patent Law Firm

(57) ABSTRACT

A high speed moving terminal including first and second antennas each communicating with first and second radio units (RUs) of a base station distributedly installed in a mobile wireless backhaul network communicates with the first and second RUs, respectively, with different uplink-downlink configuration of the first RU and the second RU, and transmits control information of the corresponding downlink signal in an uplink subframe that comes first in the time domain after processing latency of a downlink signal received from the first RU among uplink frames with the uplink-downlink configurations of the first RU and the second RU if the downlink signal is received from the first RU through the first antenna.

14 Claims, 11 Drawing Sheets

(51) Int. Cl.
    *H04W 88/02* (2009.01)
    *H04W 88/08* (2009.01)
(52) U.S. Cl.
    CPC ........ *H04W 72/0413* (2013.01); *H04W 88/02* (2013.01); *H04W 88/08* (2013.01)

(56) References Cited

U.S. PATENT DOCUMENTS

| | | | | |
|---|---|---|---|---|
| 9,848,362 | B2* | 12/2017 | Axmon | H04W 24/10 |
| 9,924,396 | B2* | 3/2018 | Takahashi | H04L 5/0055 |
| 9,961,673 | B2* | 5/2018 | Wei | H04L 1/00 |
| 10,014,912 | B2* | 7/2018 | Li | H04B 7/024 |
| 10,075,263 | B2* | 9/2018 | Kusashima | H04W 72/04 |
| 10,090,990 | B2* | 10/2018 | Suzuki | H04L 5/001 |
| 10,187,882 | B2* | 1/2019 | Kusashima | H04W 28/04 |
| 10,244,534 | B2* | 3/2019 | Suzuki | H04L 1/1854 |
| 2004/0058678 | A1* | 3/2004 | deTorbal | H04W 36/32 455/437 |
| 2009/0196249 | A1* | 8/2009 | Kawamura | H04B 1/7143 370/330 |
| 2011/0143655 | A1 | 6/2011 | Ahn et al. | |
| 2012/0147831 | A1* | 6/2012 | Golitschek | H04L 1/0026 370/329 |
| 2013/0163461 | A1* | 6/2013 | Kim | H04B 7/0626 370/252 |
| 2013/0322330 | A1* | 12/2013 | Kim | H04W 16/00 370/328 |
| 2014/0192687 | A1 | 7/2014 | Kim et al. | |
| 2014/0286281 | A1* | 9/2014 | Jang | H04L 5/0092 370/329 |
| 2014/0301371 | A1* | 10/2014 | Maeda | H04W 76/10 370/331 |
| 2015/0003351 | A1* | 1/2015 | Park | H04J 1/02 370/329 |
| 2015/0078270 | A1* | 3/2015 | Seo | H04W 52/46 370/329 |
| 2015/0312905 | A1* | 10/2015 | Seo | H04B 7/2656 370/280 |
| 2016/0345221 | A1* | 11/2016 | Axmon | H04W 24/10 |
| 2016/0345222 | A1* | 11/2016 | Axmon | H04W 36/0016 |

* cited by examiner

HIGH SPEED MOVING TERMINAL AND METHOD FOR TRANSMITTING CONTROL INFORMATION THEREOF, AND METHOD FOR RECEIVING CONTROL INFORMATION OF BASE STATION IN MOBILE WIRELESS BACKHAUL NETWORK

CROSS-REFERENCE TO RELATED APPLICATION

This application claims priority to and the benefit of Korean Patent Application No. 10-2016-0091640, filed in the Korean Intellectual Property Office on Jul. 19, 2016, the entire content of which is incorporated herein by reference.

BACKGROUND OF THE INVENTION

1. Field of the Invention

The present invention relates to a high, speed moving terminal, a method for transmitting control information thereof, and a method for receiving control information of a base station in a mobile wireless backhaul network, and more particularly, to a method for reducing a latency time of control information to be transmitted between a base station and a terminal using a plurality of links between distributed antennas of the base station and antennas installed in a high speed moving object in a mobile wireless backhaul network.

2. Description of Related Art

In a mobile wireless backhaul network for a high speed moving object into which numerous users using the Internet get, generally, a mobile wireless backhaul terminal (hereinafter, referred to as "high speed moving terminal") in which a transmitting/receiving antenna is mounted outside the high speed moving object transmits/receives backhaul data for mobile data services of the users in the high speed moving object to/from a base station. A high speed moving terminal acts as a mobile relay to serve the backhaul data transmitted/received to and from the base station to the user terminal in the high speed moving object by using technologies such as Wi-Fi or a small cell A method of transmitting/receiving backhaul data using a high speed moving terminal between a base station and a user terminal in a high speed moving object has an advantage of overcoming a radio wave loss that may occur when a radio wave received from an outside of the high speed moving object upon direct communication between the user terminal and the base station passes through an inside of the high speed moving object. In addition, the method may reduce handover signaling overhead that may occur when the many user terminals in a high speed moving object perform the handover at the same time at a cell boundary by allowing high speed moving terminal to perform a group handover instead.

Since the mobile wireless backhaul network as described above acts as a wireless backhaul for the Wi-Fi or small cell services in the high speed moving object, reducing the latency in the mobile wireless backhaul network is one of the most important issues. However, currently, there is a problem in that in the case of general TDD-based mobile wireless backhaul network and cellular network, control information (ACK/NACK, or the like) for a received downlink is not quickly transmitted on an uplink due to characteristics of an uplink-downlink configuration.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a high speed moving terminal, a method for transmitting control information thereof, and a method for receiving control information of a base station in a mobile wireless backhaul network having advantages of effectively reducing latency of control information in a mobile wireless backhaul network for a high speed moving object.

An exemplary embodiment of the present invention provides a method for transmitting, control information in a high speed moving terminal including first and second antennas each communicating with first and second radio units (RUs) of a base station distributedly installed in a mobile wireless backhaul network. The method may include: communicating with the first and second FRUs with different uplink-downlink configurations of the first RU and the second RU; receiving a downlink signal from the first RU through the first antenna; and transmitting control information of the corresponding, downlink signal in an uplink subframe that comes first in the time domain after processing latency of the downlink signal received from the first RU, among uplink frames with the uplink-downlink configurations of the first RU and the second RU.

The uplink-downlink configurations of the first RU and the second RU may be determined based on uplink-downlink configuration indices, and cyclic shift values among a plurality of uplink-downlink configurations cyclically shifted depending on the cyclic shift values for each uplink-downlink configuration index.

The uplink-downlink configurations of the first RU and the second RU may have the same uplink-downlink configuration indices and different cyclic shift values.

The transmitting may include transmitting the control information through the second antenna when its uplink subframe that comes first in the time domain is the subframe with the uplink-downlink configuration of the second RU.

The transmitting may include: allocating the control information to an uplink resource location in an allocated radio resource area and allocating an uplink pilot signal to an uplink pilot resource location; and not allocating any signal to at least one of downlink pilot resource locations in the radio resource area.

The transmitting may include: receiving timing advance (TA) values of the first antenna and the second antenna from the base station; adjusting transmission timing by the TA value of the antenna transmitting the control information among the first antenna and second antenna; and transmitting the control information through the corresponding antenna at the adjusted transmission timing.

Another embodiment of the present invention provides a high speed moving terminal communicating with a plurality of radio units (RU) of a base station distributedly installed in a mobile wireless backhaul network. The high speed moving terminal may include a first antenna, a second antenna, a first signal processor, a second signal processor, and a controller. The first antenna may communicate with a first RU with a first uplink-downlink configuration among the plurality of RUs. The second antenna may communicate with a second RU with a second uplink-downlink configuration among the plurality of RUs. The first signal processor may be connected to the first antenna. The second signal processor may be connected to the second antenna. The controller may select an uplink subframe that comes first in the time domain after processing latency of the downlink signal received at any one of the first antenna and the second antenna, among uplink subframes with the first and second uplink-downlink configurations, and transmit control information of the corresponding downlink signal in the selected uplink subframe.

The first and second uplink-downlink configurations may be determined based on uplink-downlink configuration indices and cyclic shift values among a plurality of uplink-downlink configurations cyclically shifted depending on the cyclic shift values for each uplink-downlink configuration index.

The first and second uplink-downlink configurations may have the same uplink-downlink configuration indices and different cyclic shift values.

The controller may allocate the control information to an uplink resource location in an allocated radio resource area and allocate an uplink pilot signal to an uplink pilot resource location, and may not allocate any signal to at least one of downlink pilot resource locations in the radio resource area.

The controller may adjust transmission timing by a timing advance (TA) value of the antenna transmitting the control information depending on TA values of the first antenna and second antenna received from the base station.

Yet another embodiment of the present invention provides a method for receiving control information at a base station of a mobile wireless backhaul network where first and second radio units (RUs) are distributedly installed. The method may include: communicating with a first antenna of a high speed moving terminal through the first RU with a first uplink-downlink configuration; communicating with a second antenna of the high speed moving terminal through the second RU with a second uplink-downlink configuration different from the first uplink-downlink configuration; removing an interference signal corresponding to a downlink signal of the first RU from an uplink signal received at the second RU and transmitted from the second antenna when a downlink transmission of the first RU and, an uplink transmission from the second antenna, overlap with each other in a time domain; and demodulating a signal from which the interference signal is removed.

The removing may include: estimating a channel between the first RU and the second RU from a downlink pilot signal included in the downlink signal transmitted from the first RU; estimating the interference signal using the downlink signal of the first RU and a channel estimation value between the first RU and the second RU; and removing the interference signal from the uplink signal.

The method may further include: calculating a TA value for adjusting transmission timing for the second antenna for symbol synchronization between the uplink signal and the interference signal; and transmitting the TA value for adjusting the transmission timing for the second antenna to the high speed moving terminal.

The first uplink-downlink configuration and the second uplink-downlink configuration may be determined based on uplink-downlink configuration indices and cyclic shift values among a plurality of uplink-downlink configurations cyclically shifted depending on the cyclic shift values for each uplink-downlink configuration index.

The uplink signal may include control information of the downlink signal transmitted from any one of the first and second RUs, and the control information includes channel state information or response signal.

The removing may include transmitting, by the high speed moving terminal, the uplink signal in the uplink subframe that comes first in the time domain after processing latency of the downlink signal received from any one of the first and second RUs, among uplink frames with the first uplink-downlink configuration and the second uplink-downlink configuration.

DETAILED DESCRIPTION OF THE EMBODIMENTS

Figure 1:
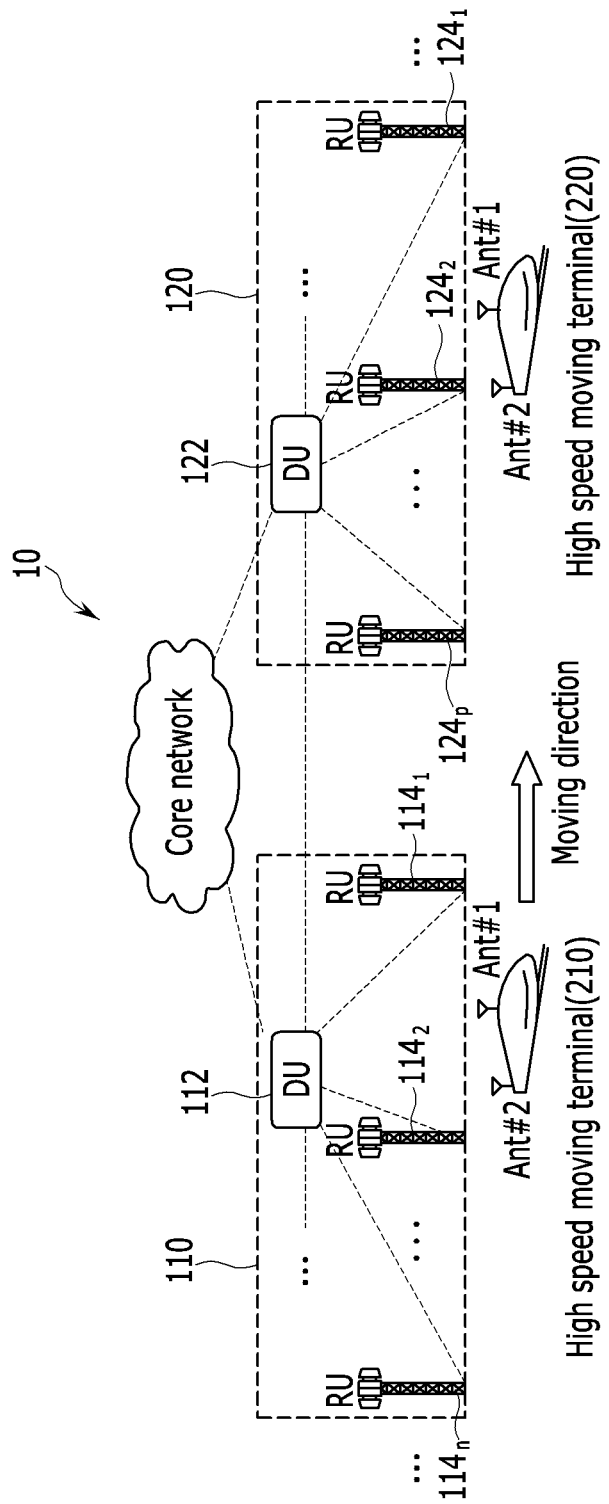
FIG. 1 is a diagram illustrating an example of a mobile wireless backhaul network for a high speed moving object according to an exemplary embodiment of the present invention.

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification, Throughout the present specification and claims, unless explicitly described to the contrary, "comprising" any components will be understood to imply the inclusion of other elements rather than the exclusion of any other elements.

Throughout the specification, a terminal may refer to a mobile terminal (MT), a mobile station (MS), an advanced mobile station (AMS), a high reliability mobile station (HR-MS), a subscriber station (SS), a portable subscriber station (PSS), an access terminal (AT), user equipment (UE), and the like and may also include all or some of the functions of the MT, the MS, the AMS, the HR-MS, the SS, the PSS, the AT, the UE, and the like.

Further, the base station (BS) may be called an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (RS) serving as a base station, a high reliability relay station (HR-RS) serving as a base station, small base stations (a femto base station (femto BS), a home, node B (HNB), a home eNodeB (HeNB), a pico base station (pico BS), a metro base station (metro BS), a micro base station (micro BS), and the like), and the like and may also include all or some of the functions of the ABS, the HR-BS, the node B, the eNodeB, the AP, the RAS, the BTS, the MMR-BS, the RS, the RN, the ARS, the HR-RS, the small base stations, and the like.

Hereinafter, a high speed moving terminal, a method for transmitting control information thereof, and a method for receiving control information of a base station in a mobile wireless backhaul network will be described with reference to the accompanying drawings.

FIG. 1 is a diagram illustrating an example of a mobile wireless backhaul network for a high speed moving object according to an exemplary embodiment of the present invention.

Referring to FIG. 1, a mobile wireless backhaul network 10 for a high speed moving object includes base stations 110 and 120 and high speed moving terminals 210 and 220. Here, the high speed moving object is commonly called moving bodies moving at high speed such as a high speed railway, a train, and a subway.

The high speed moving terminals 210 and 220 include a plurality of transmitting/receiving antennas Ant#1 and Ant#2 that are installed outside the high speed moving object, and may use the plurality of transmitting/receiving antennas Ant#1 and Ant#2 to transmit/receive data to and from the base stations 110 and 120, respectively. The plurality of transmitting/receiving antennas. Ant#1 and Ant#2 may be distributedly installed outside the high speed moving object.

In addition, the high speed moving terminals 210 and 220 may be connected to at least one small cell or a Wi-Fi access point (AP) that is located inside the high speed moving object and may transmit/receive data to and from user terminals in the high speed moving object through the small cell or the Wi-Fi AP.

The high speed moving terminals 210 and 220 perform communications based on a wireless backhaul concept between the user terminal and the base station to provide services to the user terminal in the high speed moving object. When the high speed moving terminals 210 and 220 perform communications based on the wireless backhaul concept, the high speed moving terminals 210 and 220 may each convert data received from the base stations 110 and 220 into a Wi-Fi signal and transmit the Wi-Fi signal to the user terminal in the high speed moving, object.

The base stations 110 and 120 are connected to a core network through an optical fiber or the like. The base stations 110 and 120 may use a millimeter wave frequency bandwidth to transmit/receive data to and from the high speed moving terminals 210 and 220.

The base stations 110/120 include one digital units (DUs) 112/122 and a plurality of radio units (RUs) $114_1$ to $114_n$/$124_1$ to $124_n$. The DU 112 of the base station 110 may be connected to the plurality of RUs $114_1$ to $114_n$, and the DU 122 of the base station 120 may be connected to RUs $124_1$ to $124_n$. The plurality of RUs $114_1$ to $114_n$ and $124_1$ to $124_n$ may be installed along a path along which the high speed moving object moves.

As described above, the high speed moving terminals 210 and 220 perform communications based on the moving wireless backhaul concept, and therefore the latency of the moving wireless backhaul deteriorates QoS of the use terminal.

Figure 2:
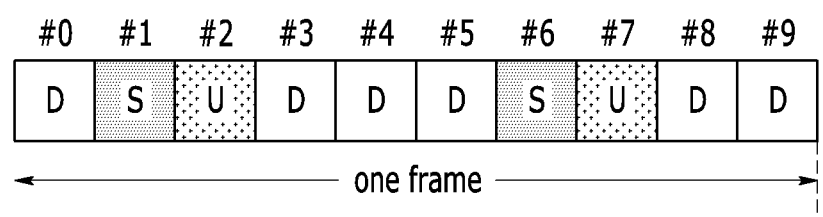
FIG. 2 is a diagram illustrating a frame structure in the mobile wireless backhaul network according to the exemplary embodiment of the present invention.

FIG. 2 is a diagram illustrating a frame structure in the mobile wireless backhaul network according to the exemplary embodiment of the present invention.

Referring to FIG. 2, one frame may include a plurality of subframes #0 to #9. Here, the subframe may be used as a slot or other terms.

In the case of a TDD scheme, each subframe #0 to #9 may be set as one of an uplink subframe, a downlink subframe, and a special subframe with the uplink-downlink configuration (UL-DL configuration). That is, locations or the number of downlink subframes, special frames, and uplink subframes are determined with the UL-DL configuration. The special subframe is set between the uplink subframe and the downlink subframe. In FIG. 2, D represents the downlink subframe, U represents the uplink subframe, and S represents the special subframe.

The structure of the frame illustrated in FIG. 2 is, only an example, and the number of subframes included in the frame may be variously changed.

Figure 3:
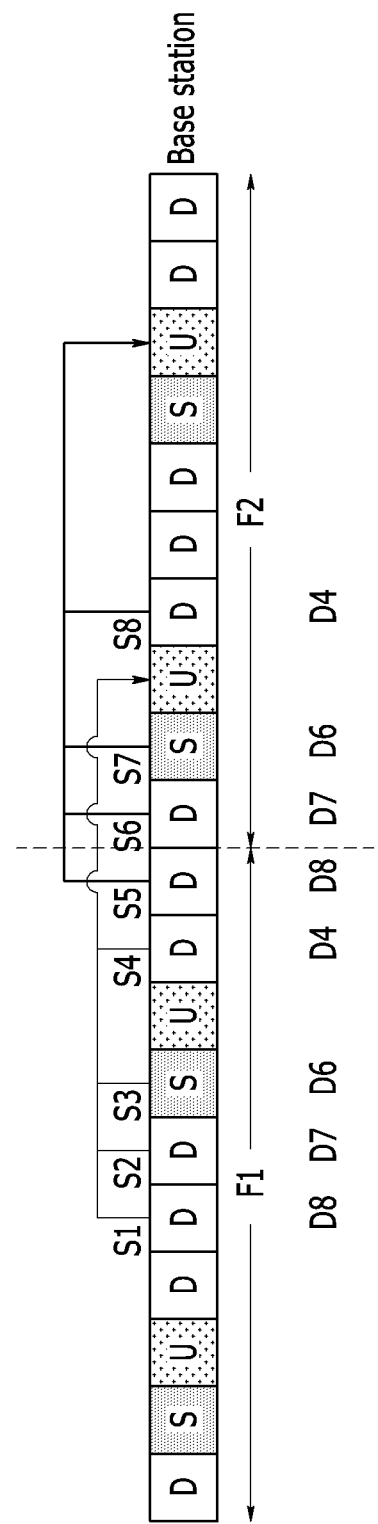
FIG. 3 is a diagram illustrating a transmission latency of control information of a received downlink signal in the frame structure illustrated in FIG. 2.

FIG. 3 is a diagram illustrating a transmission latency of control information of a received downlink signal in the frame structure illustrated in FIG. 2.

Referring to FIG. 3, if receiving the downlink signal from the base station 110, the high speed moving terminal (for example, 210) transmits a response signal to the downlink signal to the base station 110. The response signal includes ACK and NACK signals, and if the downlink signal is successfully decoded, the ACK signal is transmitted and if the decoding of the downlink signal fails, the NACK signal is transmitted.

The base station 110 receiving the NACK signal retransmits the downlink signal.

If it is assumed that the high speed moving terminal 210 needs four subframes to receive and process the downlink signal of the base station 110, the response signal to the downlink signal transmitted in some downlink subframes in the frame structure illustrated in FIG. 3 may be transmitted through an uplink subframe of the next frame after a delay of eight subframes.

For example, when a downlink signal S1 is transmitted in downlink subframe #4 of frame F1, the high speed moving terminal 210 may transmit a response signal to the base station 110 in uplink subframe #2 of frame F2 next to eight subframes from the downlink subframe #4. As a result, the retransmission of the downlink signal of the base station 110 is delayed.

In the frame structure illustrated in FIG. 3, eight downlink signals S1 to S8 may be transmitted in, for example, the downlink subframes #4, #5, #6, #8, and #9 of the frame F1 and the downlink subframes #0, #1, and #3 of the frame F2. Response signals to the downlink signals S1 to S4 transmitted in the downlink subframes #4, #5, #6, and #8 of the frame F1 may be transmitted in the uplink subframe #2 of the frame F2, and response signals to the downlink signals S5 to S8 transmitted in the downlink subframe #9 of the frame F1 and the downlink subframes #0, #1, and #3 of the frame F2 may be transmitted in the uplink subframe #7 of the frame F2.

That is, the response signals to eight downlink signals S1 to S8 are each transmitted through an uplink frame after delays D8, D7, D6, D4, D8, D7, D6, and D4 of eight, seven, six, four, eight, seven, six, and four subframes, and a sum of latency time of the response signals to the eight downlink signals S1 to S8 becomes 50 subframes.

In the exemplary embodiment of the present invention, a new UL-DL configuration for reducing the latency problem is suggested.

The following Table 1 shows the UL-DL configuration defined in the TDD-based mobile wireless backhaul network for the high speed moving object according to exemplary embodiment of the present invention.

TABLE 1

| UL-DL configuration | CS | #0 | #1 | #2 | #3 | #4 | #5 | #6 | #7 | #8 | #9 |
|---|---|---|---|---|---|---|---|---|---|---|---|
| 0 | 0 | D | S | U | D | D | D | S | U | D | D |
|   | 1 | D | D | S | U | D | D | D | S | U | D |
|   | 2 | D | D | D | S | U | D | D | D | S | U |
|   | 3 | U | D | D | D | S | U | D | D | D | S |
|   | 4 | S | U | D | D | D | S | U | D | D | D |
| 1 | 0 | D | S | U | U | D | D | S | U | U | D |
|   | 1 | D | D | S | U | U | D | D | S | U | U |
|   | 2 | U | D | D | S | U | U | D | D | S | U |
|   | 3 | U | U | D | D | S | U | U | D | D | S |
|   | 4 | S | U | U | D | D | S | U | U | D | D |
| ... | ... | ... | ... | ... | ... | ... | ... | ... | ... | ... | ... |
| $N_{conf-1}$ | ... | ... | ... | ... | ... | ... | ... | ... | ... | ... | ... |

Referring to the above Table 1, several cyclically shifted UL-DL configurations are defined by cyclic shift (CS) values corresponding to each UL-DL configuration index 0, 1, or $N_{conf-1}$.

As described above, the most important feature of the UL-DL configuration according to the exemplary embodiment of the present invention is that a plurality of UL-DL configurations cyclically shifted for each UL-DL configuration index are defined.

At this time, according to the exemplary embodiment of the present invention, to reduce the latency of the moving wireless backhaul, two RUs (for example, $114_1$ and $114_2$) communicating with two transmitting/receiving antennas Ant#1 and Ant#2 of the high speed moving terminal (for example, 210) use different UL-DL configurations by different UL-DL configuration indices and/or different CS values. The UL-DL configuration to, be used, in the two RUs (for example, $114_1$ and $114_2$) may be determined in the DU (for example, 112).

Figure 4:
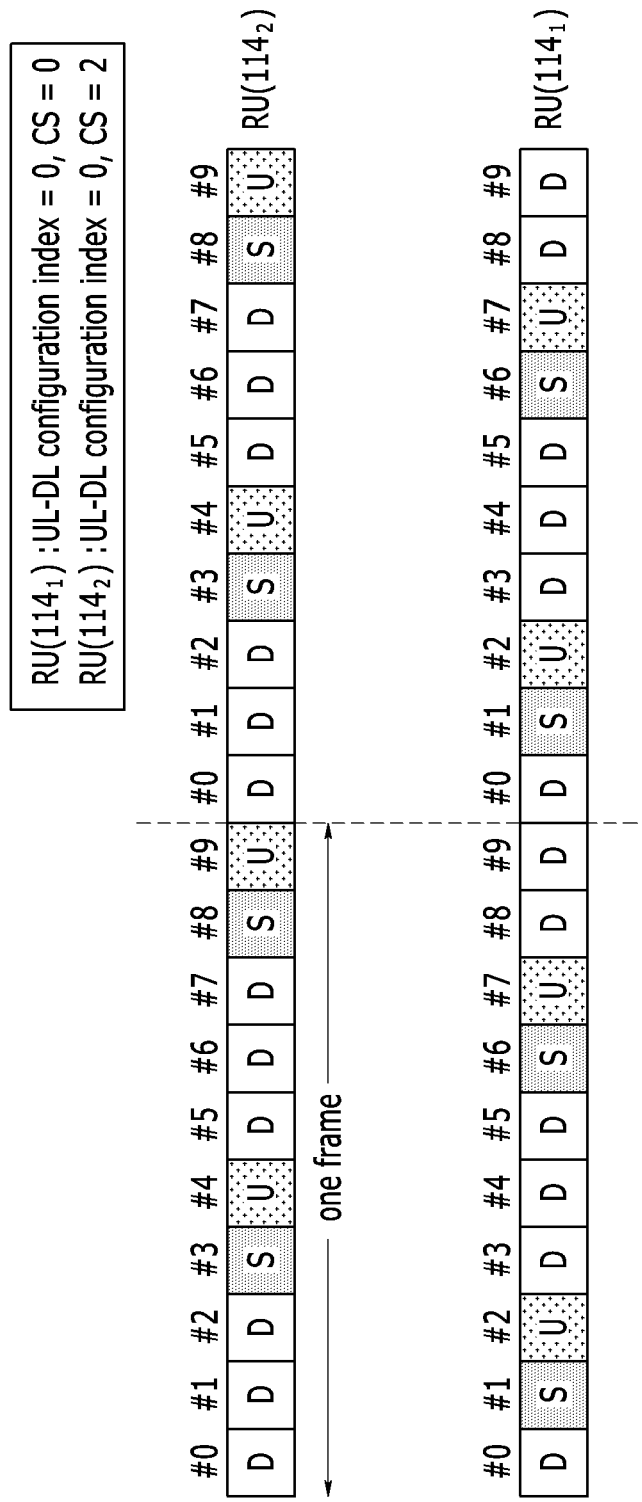
FIG. 4 is a diagram illustrating an example of uplink-downlink configurations to be used in each RU according to an exemplary embodiment of the present invention.

FIG. 4 is a diagram illustrating an example of uplink-downlink configurations (UL-DL configurations) to be used in each RU according to an exemplary embodiment of the present invention.

The DUs 112/122 of the base stations 110/120 determine the UL-DL configuration to be used in each RU $114_1$ to $114_n/124_1$ to $124_n$ among the UL-DL configurations shown in the above Table 1. At this time, the DUs 112/122 use different UL-DL configuration in each RU $114_1$ to $114_n/124_1$ to $124_n$.

For example, when the two transmitting/receiving antennas Ant#1 and Ant#2 and the two RUs (for example, $114_1$, $114_2$) of the high speed moving terminal (for example, 210) communicate with each other, as illustrated in FIG. 4, the DU 112 may determine an UL-DL configuration in which UL-DL configuration index=0 and CS=0 as the UL-DL configuration to be used in the RU $114_1$ and determine an UL-DL configuration in which UL-DL configuration index=0 and CS=2 as the UL-DL configuration to be used in the RU $114_2$.

Figure 5:
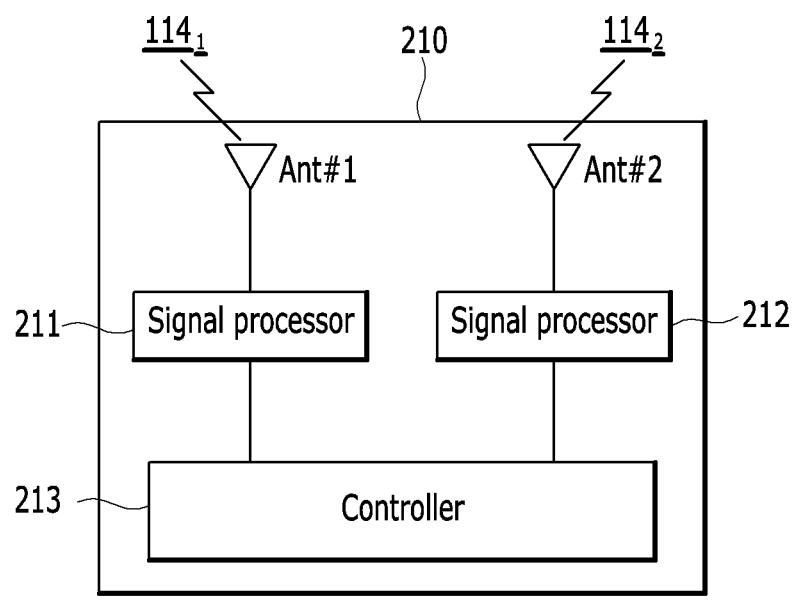
FIG. 5 is a diagram illustrating an example of a high speed moving terminal according to an exemplary embodiment of the present invention.

FIG. 5 is a diagram illustrating an example of a high speed moving terminal according to an exemplary embodiment of the present invention. Although FIG. 5 illustrates the high speed moving terminal 210, even the high speed moving terminal 220 may have the same configuration as or a similar configuration to the high speed moving terminal 210.

Referring to FIG. 5, the high speed moving terminal 210 includes the plurality of transmitting/receiving antennas Ant#1 and Ant#2, a plurality of signal processors 211 and 212, and a controller 213. The plurality of signal processors 211 and 212 and the controller 213 may be each implemented as a central processing unit (CPU), other chipsets, microprocessor or the like.

The transmitting/receiving antennas Ant#1 and Ant#2 are installed outside the high speed moving object at a predetermined interval. The transmitting/receiving antennas Ant#1 and Ant#2 transmit/receive a radio signal to and from the base station 110.

The plurality of signal processors 211 and 212 are each connected to the transmitting/receiving antennas Ant#1 and Ant#2, and process radio signals received through the corresponding transmitting/receiving, antennas Ant#1 and Ant#2 and transmit the radio signals to the controller 213, and process the radio signals received from the controller 213 and transmit the radio signals to the corresponding transmitting/receiving antennas Ant#1 and Ant#2.

The controller 213 determines the uplink subframe in which the response signal to the downlink signal received from any one RU is transmitted and transmits the response signal in the determined uplink subframe, in the frame structure determined by the UL-DL configuration information set in the RUs communicating with the transmitting/receiving antennas Ant#1 and Ant#2, respectively.

For example, it is assumed that the transmitting/receiving antennas Ant#1 and Ant#2 each communicate with the RUs $114_1$ and $114_2$, and the UL-DL configuration used in the RUs $114_1$ and $114_2$ is the same as FIG. 4. If receiving the downlink signal from the RU $114_1$ in the downlink subframe #4, the controller 213 determines, as the uplink subframe in which the response signal to the downlink signal received from the RU $114_1$ is transmitted, the uplink subframe [subframe #9 in the frame structure with the UL-DL configuration used in RU $114_2$] that comes first in the time domain after four subframes required to process the downlink signal from time corresponding to the downlink subframe #4 in the frame structure with the UL-DL configuration used in the RUs $114_1$ to $114_2$. That is, the response signal to the downlink signal received from the RU $114_1$ is transmitted to the RU $114_2$ through the transmitting/receiving antenna Ant#2 communicating with the RU $114_2$ in the uplink subframe #9.

Figure 6:
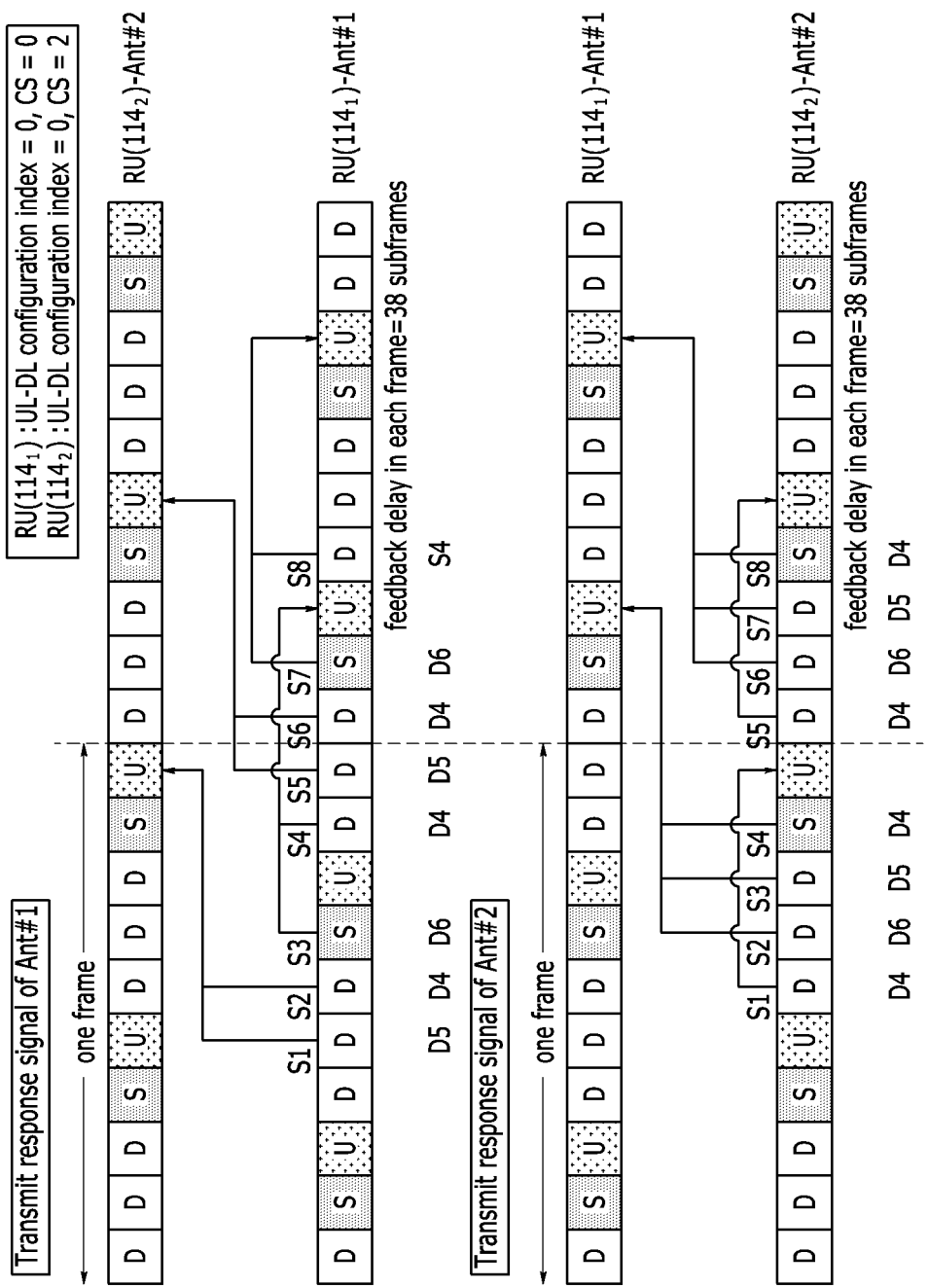
FIG. 6 is a diagram illustrating the transmission latency of the response signal according to the exemplary embodiment of the present invention.

FIG. 6 is a diagram illustrating the latency of the response signal according to the exemplary embodiment of the present invention.

Referring to FIG. 6, when the transmitting/receiving antennas Ant#1 and Ant#2 of the high speed moving terminal 210 communicate with the RUs $114_1$ and $114_2$ of the base station 110 having different CS values as illustrated in FIG. 4, the sum of the latency time of response signals to eight downlink signals becomes 38 subframes.

In detail, the RU 114$_1$ may transmit the eight downlink signals S1 to S8 in the subframes #4, #5, #6, #8, and #9 of the frame F1 and the subframes #0, #1, and #3 of the frame F2 with the UL-DL configuration applied to the RU 114$_1$. The response signals to eight downlink signals S1 to S8 are transmitted in the uplink subframe #9 of the frame F1 and the uplink subframe #4 of the frame F2 with the UL-DL configuration applied to the RU 114$_2$ and the uplink subframe #2 of the frame F2 and the uplink subframe #7 of the frame F2 with the UL-DL configuration applied to the RU 114$_1$. Therefore, the sum of the latency time of the response signals to the eight downlink signals S1 to S8 transmitted from the RU 114$_1$ becomes 38 subframes.

Similarly thereto, the RU 114$_2$ transmits the eight downlink signals S1 to S8 in the subframes #5, #6, #7, and #8 of the frame F1 and the subframes #0, #1, #2, and #3 of the frame F2 with the UL-OL configuration applied to the RU 114$_2$. The response signals to the eight downlink signals S1 to S8 are transmitted in the uplink subframe #9 of the frame F1 with the UL-DL configuration applied to the RU 114$_2$, the uplink subframe #2 of the frame F2 with the UL-DL configuration applied to the RU 114$_1$, the uplink subframe #4 of the frame F2 with the UL-DL configuration applied to the RU 114$_2$, and the uplink subframe #7 of the frame F2 with the UL-DL configuration applied to the RU 114$_1$. Therefore, the sum of the latency time of the response signals to the eight downlink signals S1 to S8 transmitted in the RU 114$_2$ becomes 38 subframes.

As described above, the UL-DL configuration having different CS values is applied to each RU 114$_1$ and 114$_2$, and the high speed moving terminal 210 communicates with each RU 114$_1$ and 114$_2$ of the base station 110 through the transmitting/receiving antennas Ant#1 and Ant#2, such that the high speed moving terminal 210 may transmit the control information like the response signal to the base station 110 through one of the transmitting/receiving antennas Ant#1 and Ant#2 with the UL-DL configuration applied to each RU 114$_1$ and 114$_2$. That is, even the response signal to the downlink signal received from the RU 114$_1$ may be transmitted to the RU 114$_2$ through the transmitting/receiving antenna Ant#2 with the UL-DL configuration applied to each RU 114$_1$ and 114$_2$ to reduce the latency. At this time, the control information may include a rank indicator (RI), a channel quality indication (CQI), a pre-coding matrix indication (PMI) or the like besides the response signal. That is, the high speed moving terminal 210 may transmit even control information such as the RI, the CQI, and the PMI to the base station 110 through one of the transmitting/receiving antennas Ant#1 and Ant#2 with the UL-DL configuration applied to each RU 114$_1$ and 114$_2$.

By doing so, the high speed moving terminal 210 may effectively reduce the latency taken to transmit the control information to the base station 110 without increasing a ratio of the uplink subframe in one frame.

However, when the RUs 114$_1$ and 114$_2$ use the UL-DL configuration having different CS values, there may be a section in which the downlink subframe in which the RU 114$_1$ transmits the downlink signal and the uplink subframe in which the RU 114$_2$ receives the uplink signal overlap each other in a time domain. For example, as can be appreciated in FIG. 4, RU 114$_1$ transmits the downlink signal in the downlink subframe #9 with the UL-DL configuration applied to the RU 114$_1$. At this time, with the UL-DL configuration applied to the RU 114$_2$, the RU 114$_2$ may receive the uplink signal in the uplink subframe #9 overlapping the downlink subframe #9 in the time domain.

As described above, if the downlink transmission overlaps with the uplink transmission in the same time domain, interference occurs between the downlink transmission and the uplink transmission.

Figure 7:
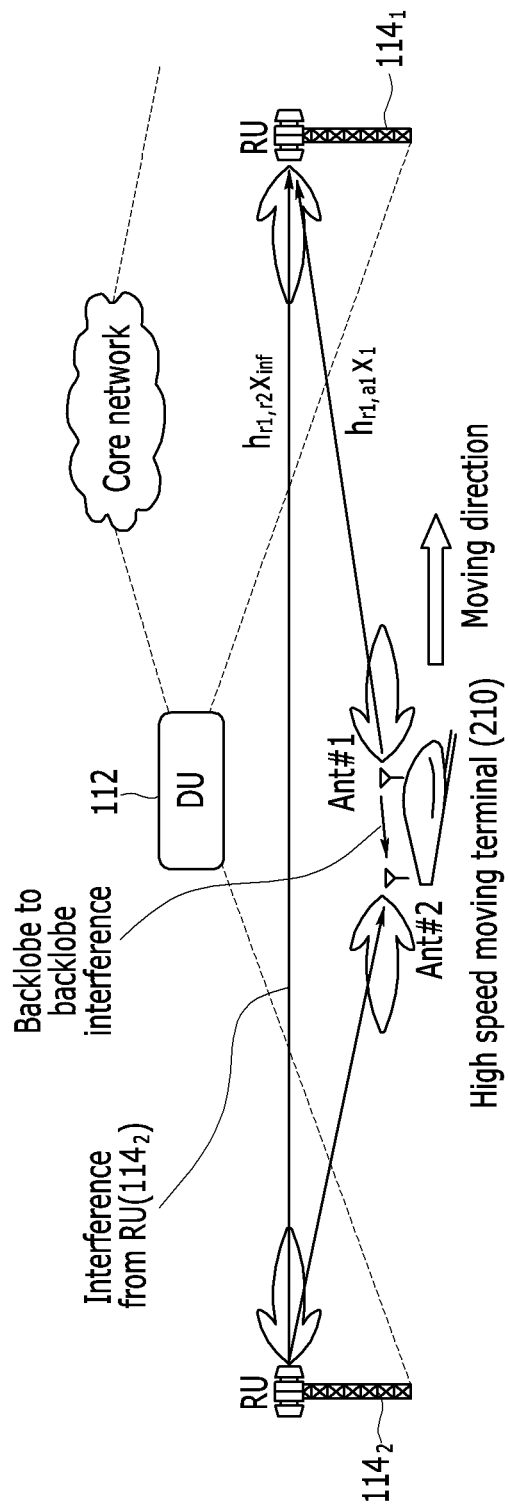
FIG. 7 is a diagram illustrating interference between the RUs of a base station according to an exemplary embodiment of the present invention.

FIG. 7 is a diagram illustrating interference between the RUs of a base station according to an exemplary embodiment of the present invention.

Referring to FIG. 7, when the RUs 114$_1$ and 114$_2$ use the UL-DL configuration having the different CS values, the uplink subframe in which the transmitting/receiving antenna Ant#1 performs the uplink transmission to the RU 114$_1$ and the downlink subframe in which the RU 114$_2$ performs the downlink transmission to the transmitting/receiving antenna Ant#2 may overlap each other in the time domain. At this time, the downlink transmission of the RU 114$_2$ has the interference influence on the received signal of the RU 114$_1$, and the uplink transmission of the transmitting/receiving antenna Ant#1 has the interference influence on the received signal of the transmitting/receiving antenna Ant#2.

However, considering that the transmitting/receiving antennas Ant#1 and Ant#2 are each installed inside a vehicle body of the front and back of a high speed moving object or a length (about 200 m) of a high speed moving object and a signal transmitted to a back lobe of a transmitting beam are received as a back lobe of a receiving beam, the interference influence of the uplink transmission of the transmitting/receiving antenna Ant#1 on the received signal of the transmitting/receiving antenna Ant#2 is not large. In addition, since a method for physically reducing an influence of a back lobe even when the transmitting/receiving antennas Ant#1 and Ant#2 are installed outside the high speed moving object is diverse, the interference influence of the uplink transmission of the transmitting/receiving antenna Ant#1 on the received signal of the transmitting/receiving antenna Ant#2 may be disregarded.

On the other hand, since a downlink signal transmitted to a main lobe of the RU 114$_2$ may be received by the main lobe of the RU 114$_1$, the interference influence of the downlink transmission of the RU 114$_2$ on the received signal of the RU 114$_1$ may not be disregarded. Therefore, the RU 114$_1$ requires a method for removing interference due to the downlink transmission of the RU 114$_2$ from the received signal.

Figure 8:
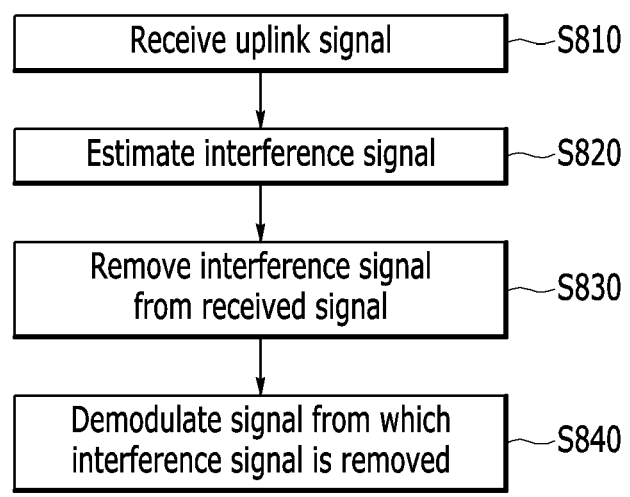
FIG. 8 is a diagram illustrating a method for removing interference according to an exemplary embodiment of the present invention.

FIG. 8 is a diagram illustrating a method for removing interference according to an exemplary embodiment of the present invention, in which a method for removing an interference signal generated in the conditions illustrated in FIG. 7 will be described.

Referring to FIG. 8, the RU 114$_1$ receives the uplink signal from the transmitting/receiving antenna Ant#1 (S810). A received signal $y_{r1}$ of the RU 114$_1$ may be represented by the following Equation 1.

$$y_{r1} + h_{r1,a1}x_1 + h_{r1,r2}x_{inf} + n_{r1} \quad \text{(Equation 1)}$$

In the above Equation 1, $x_1$ represents the uplink signal of the transmitting/receiving antenna Ant#1 and $h_{r1,a1}$ represents a channel between the transmitting/receiving antenna Ant#1 and the RU 114$_1$. $h_{r1,r2}x_{inf}$ represents an interference signal received at the RU 114$_1$, $h_{r1,r2}$ represents a channel between the RUs 114$_1$ and 114$_2$, and $x_{inf}$ represents a downlink signal transmitted from the RU 114$_2$. $n_{r1}$ represents a noise signal.

The base station 110 estimates the interference signal $h_{r1,r2}x_{inf}$ corresponding to the downlink signal of the RU 114$_2$ (S820) and removes the interference signal $h_{r1,r2}x_{inf}$ from the received signal $y_{r1}$ (S830).

The base station 110 demodulates a signal from which the interference signal is removed (S840).

Furthermore, the uplink subframe in which the transmitting/receiving antenna Ant#2 performs the uplink transmission to the RU $114_2$ and the downlink subframe in which the RU $114_1$ performs the downlink transmission to the transmitting/receiving antenna Ant#1 may overlap each other in the time domain. The base station 110 estimates the interference signal corresponding to a downlink signal of the RU $114_1$ and removes the interference signal from uplink signal received at the RU $114_2$ and transmitted from the transmitting/receiving antenna Ant#2.

Since the base station 110 according to the exemplary embodiment of the present invention has a structure in which one DU 112 manages the plurality of RUs $114_1$ to $114_n$, it is possible to estimate the interference signal $h_{r1,r2}x_{inf}$ and remove the estimated interference signal $h_{r1,r2}x_{inf}$.

Figure 9:
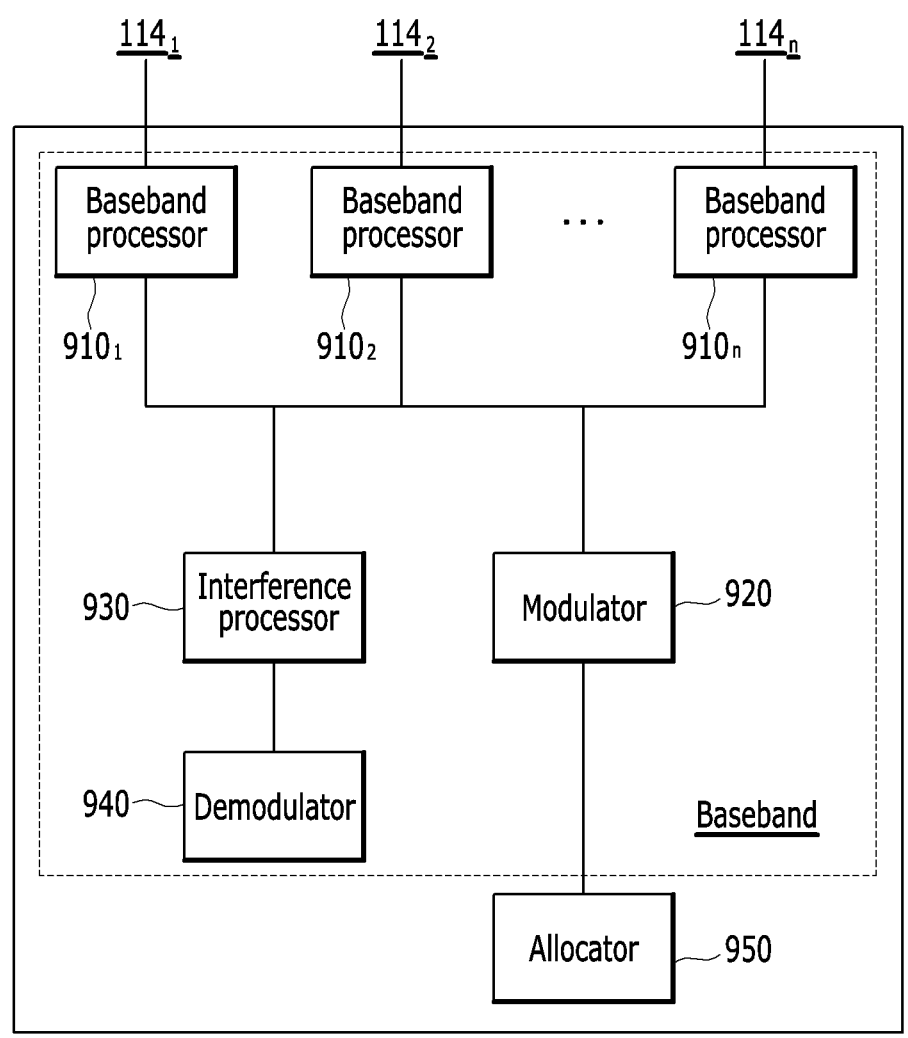
FIG. 9 is a diagram illustrating an apparatus for removing interference of a base station according to an exemplary embodiment of the present invention.

FIG. 9 is a diagram illustrating a part of the base station according to the exemplary embodiment of the present invention.

Referring to FIG. 9, the base station may include a plurality of baseband processors $910_1$ to $910_n$, a modulator 920, an interference processor 930, and a demodulator 940. The base station 110 may further include an allocator 950. Here, the baseband processors $910_1$ to $910_n$, the modulator 920, the interference processor 930, the demodulator 940, and the allocator 950 may be implemented in the DUs 112 and 122.

The plurality of baseband processors $910_1$ to $910_n$ each are connected to the RUs $114_1$ to $114_n$ of the base station 110, process the downlink signal modulated by the modulator 920 and transmit the processed downlink signal to the corresponding RUs $114_1$ to $114_n$, and process the uplink signal received from the RUs $114_1$ to $114_n$ and transmit the processed uplink signal to the interference processor 930. In addition, the plurality of baseband processors $910_1$ to $910_n$ are connected to adjacent baseband processors through an interface, and may transmit and receive data between the baseband processors $910_1$ to $910_n$ through the interface.

The removal of the interference based on the conditions illustrated in FIG. 7 will be described with reference to FIG. 9.

The baseband processor $910_2$ of the plurality of baseband processors $910_1$ to $910_n$ transmits the downlink signal modulated by the modulator 920 to the corresponding RU $114_2$, and transmits the modulated downlink signal to the adjacent baseband processor $910_1$ located in a moving direction of the high speed moving object through the interface. In addition, the baseband processor $910_1$ transmits the modulated downlink signal $x_{inf}$ to the interference processor 930. In addition, the baseband processor $910_1$ transmits the uplink signal transmitted from the RU $114_1$ to the interference processor 930.

The modulator 920 modulates the downlink signal to be transmitted and transmits the modulated downlink signal to the baseband, processor $910_2$.

The interference processor 930 estimates the channel between the two RUs $114_1$ and $114_2$ based on a downlink pilot signal transmitted from the RU $114_2$ and generates the interference signal $h_{r1,r2}x_{inf}$ received from the RU $114_2$ based on the modulated downlink signal $x_{inf}$ and the channel estimation value $h_{r1,r2}x_{inf}$ between the two RUs $114_1$ and $114_2$. The interference processor 930 removes the interference signal $h_{r1,r2}x_{inf}$ corresponding to the downlink signal of the RU $114_2$ from the received signal $y_{r1}$ of the RU $114_1$. The signal from which the interference signal is removed is transmitted to the demodulator 940.

The demodulator 940 demodulates the signal from which the interference signal is removed.

Meanwhile, even when the uplink subframe in which the transmitting/receiving antenna Ant#2 performs the uplink transmission to the RU $114_2$ and the downlink subframe in which the RU $114_1$ performs the downlink transmission to the transmitting/receiving antenna Ant#1 overlaps each other in the time domain, the above-mentioned method for removing interference may be used to remove the interference signal corresponding to the downlink signal of the RU $114_1$ from the received signal of the RU $114_2$.

The allocator 950 determines the UL-DL configuration to be used in the RUs $114_1$ to $114_n$ and allocates a radio resource for a downlink signal according to the UL-DL configuration of the RU to be used for transmission.

Figure 10:
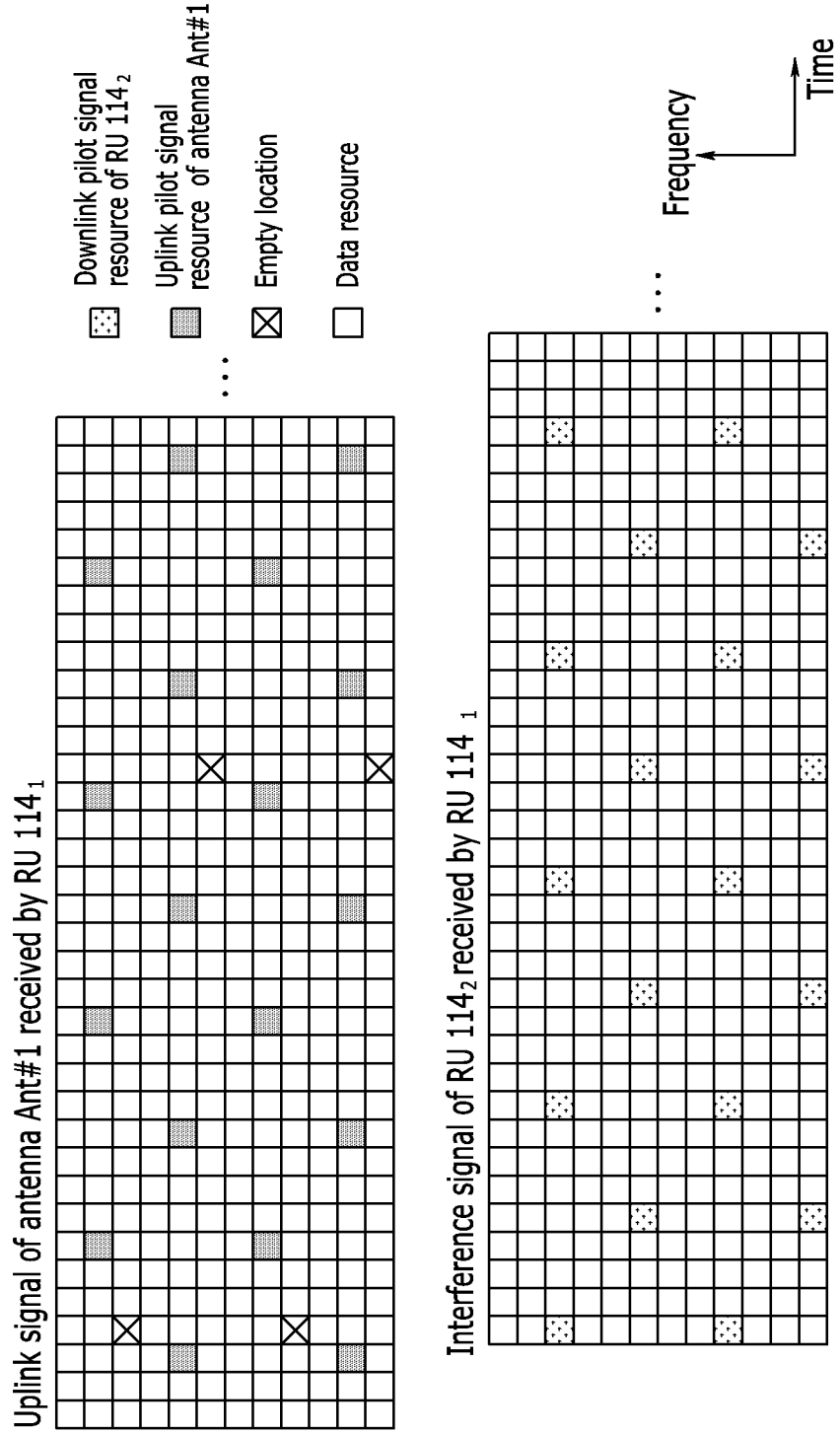
FIG. 10 is a diagram illustrating a method for transmitting an uplink signal for accurate channel estimation between RUs according to an exemplary embodiment of the present invention.

FIG. 10 is a diagram illustrating a method for transmitting an uplink signal for accurate channel estimation between RUs according to an exemplary embodiment of the present invention.

Referring to FIG. 10, for the accurate channel estimation between the RU $114_1$ and $114_2$, the high speed moving terminal 210 does not allocate any signal to a location of a radio resource at which the downlink pilot signal of the RU $114_2$ is transmitted when transmitting the uplink signal through the transmitting/receiving antennal Ant#1 and leaves the location empty.

The uplink signal and the downlink signal are transmitted through the radio resource of the time and frequency.

The base station 110 allocates downlink data to a downlink data resource location in the allocated radio resource area, and allocates the downlink pilot signal to the downlink pilot resource location.

Similarly, the high speed moving terminal 210 allocates uplink data to the uplink data resource location in the allocated radio resource area and the uplink pilot signal to the uplink pilot resource location. At this time, for the accurate channel estimation between the RUs $114_1$ and $114_2$, the high speed moving terminal 210 does not allocate any signal to the downlink pilot resource location and leaves the location empty, thereby improving the channel estimation performance between the RUs $114_1$ and $114_2$.

At this time, the locations of the RUs $114_1$ to $114_n$ of the base station 110 are fixed, and therefore the channel between the RUs $114_1$ and $114_2$ is also a fixed channel. Therefore, since the channel variation in both time and frequency domains is not quick, all the downlink pilot signals need not to be received by the interference processor 930 for the channel estimation between the RUs $114_1$ and $114_2$.

That is, as illustrated in FIG. 10, the high speed moving terminal 210 does not allocate any signal only to some of the downlink pilot resource locations and may leave the location empty. Next, the interference processor 930 may use only the downlink pilot signal received at the corresponding location to more accurately estimate the channel between the RUs $114_1$ and $114_2$.

Other methods may also be used to perform the accurate channel estimation between the RUs $114_1$ and $114_2$. For example, the downlink pilot signal of the RU $114_1$ and the uplink pilot signal of the high speed moving terminal 210 are likewise designed based on a Zadoff-Chu (ZC) sequence, thereby improving the channel estimation performance between the RUs $114_1$ and $114_2$.

Like the general cellular communication network, in the case of the mobile wireless backhaul network using a relatively lower frequency bandwidth, since a cyclic prefix (CP) is, sufficiently long, symbol synchronization between the uplink signal of the high speed moving terminal 210 received from the RU 114₁ of the base station and the interference signal received from another RU 114₂ may be matched. However, in the case of the moving wireless backhaul using a high frequency bandwidth like a millimeter wave, the CP is very short and therefore the symbol synchronization may not be matched. Therefore, there is a need to match the symbol synchronization between the uplink signal of the high speed moving terminal 210 received from the RU 114₁ of the base station 110 and the interference signal received from another RU 114₂.

Figure 11:
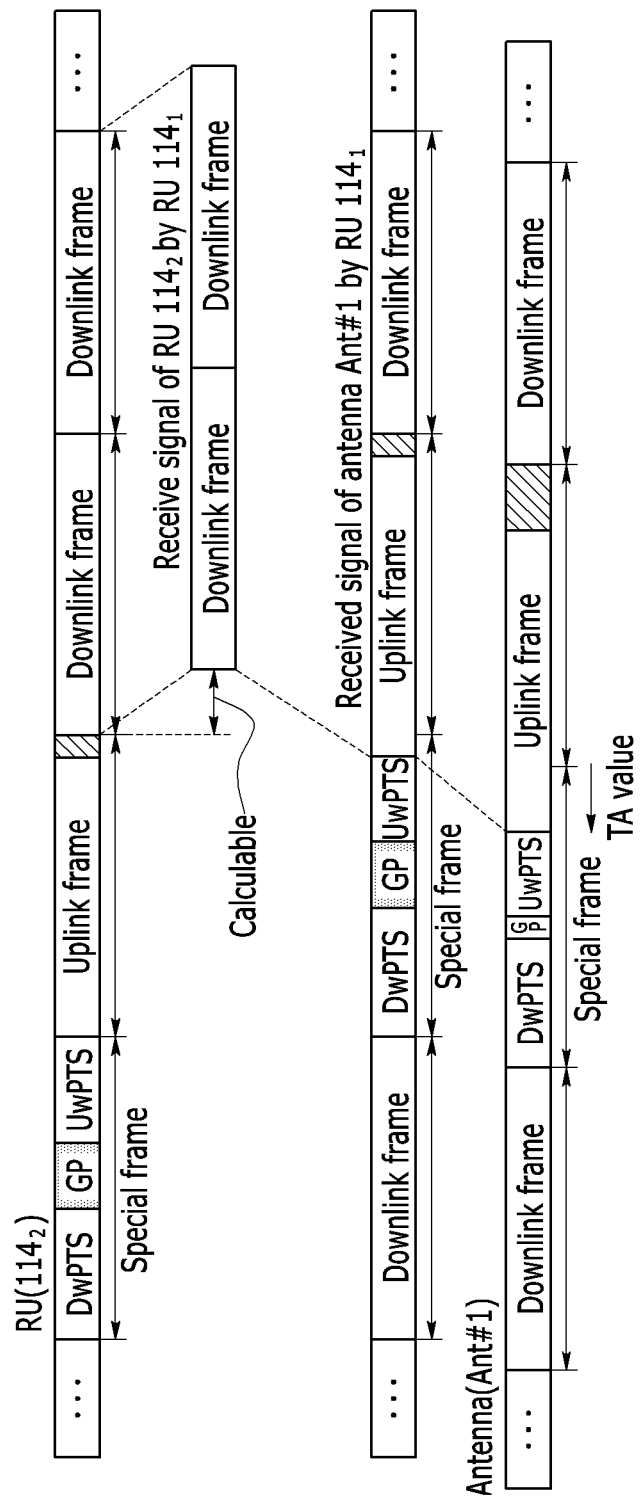
FIG. 11 is a diagram illustrating a method for symbol synchronization between an uplink signal and an interference signal according to an exemplary embodiment of the present invention.

FIG. 11 is a diagram illustrating a method for symbol synchronization between an uplink signal and an interference signal according to an exemplary embodiment of the present invention. FIG. 11 illustrates only some subframes in the frame for convenience of explanation.

Referring to FIG. 11, for the symbol synchronization between the uplink signal of the high speed moving terminal 210 received from the RU 114₁ and the interference signal received from another RU 114₂, reception timing of the RU 114₁ and transmission time of the high speed moving terminal 210 may be adjusted.

Since the downlink transmission of the RU 114₂ is accurately performed at a frame boundary, and the locations of the RUs 114₁ and 114₂ are fixed, the RU 114₁ may calculate the accurate receiving frame boundary of the interference signal.

Next, if the RU 114₁ receives the uplink signal from the high speed moving terminal 210, a timing advance (TA) value at which the symbol synchronization with the interference signal may be matched is calculated and transmitted to the high speed moving terminal 210. Then, the high speed moving terminal 210 adjusts the transmission timing of the uplink signal depending on the TA value, and transmits the uplink signal at the adjusted transmission timing.

According to an embodiment of the present invention, in the TDD-based mobile wireless backhaul network for the high speed moving object, the different uplink-downlink configurations are applied to each RU of the base station and the plurality of signal processing apparatuses connected to each of the plurality of antennas installed outside the high speed moving object communicate with each RU of the base station to transmit the control information (ACK/NACK or the like) of the specific signal processing apparatus to the base station using the uplink of other signal processing apparatuses, thereby effectively reducing the latency of the control information. In particular, if the uplink-downlink configuration cyclically shifted for each RU of the base station is applied, it is possible to effectively reduce the latency without increasing the ratio of the uplink subframe in one frame.

The exemplary embodiments of the present invention are not implemented only by the apparatus and/or method as described above, but may be implemented by programs for realizing the functions corresponding to the configuration of the exemplary embodiments of the present invention or the recording medium recorded with the programs, which may be readily implemented by a person having ordinary skill in the art to which the present invention pertains from the description of the foregoing exemplary embodiments.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting control information in a high speed moving terminal including a first antenna and a second antenna, the method comprising:
   communicating with a first radio unit (RU) of a base station by using the first antenna based on a first uplink-downlink configuration, and communicating with a second RU of the base station by using the second antenna based on a second uplink-downlink configuration which is different from the first uplink-downlink configuration;
   receiving a downlink signal from the first RU through the first antenna; and
   transmitting control information corresponding to the downlink signal to the second RU by using the second antenna through an uplink subframe according to the second uplink-downlink configuration,
   wherein a number of uplink subframes included in the second uplink-downlink configuration is the same as a number of uplink subframes included in the first uplink-downlink configuration, and a switching point from downlink to uplink in the second uplink-downlink configuration is cyclically shifted from a switching point from downlink to uplink in the first uplink-downlink configuration by a predetermined number of subframes.

2. The method of claim 1, wherein the transmitting includes transmitting an acknowledgment signal (ACK) or a negative acknowledgment signal (NACK) corresponding to the downlink signal to the second RU by using the second antenna.

3. The method of claim 1, wherein the transmitting of the control information includes:
   receiving a pilot signal from the second RU by using the second antenna through a downlink subframe based on the second uplink-downlink configuration; and
   transmitting no uplink signal by using the first antenna through at least one resource element included in the uplink subframe when the at least one resource element included in the uplink subframe overlaps, on time and frequency domain, with a resource element of the downlink subframe carrying the pilot signal.

4. The method of claim 1, wherein the transmitting includes:
   receiving timing advance (TA) values of the first antenna and the second antenna from the base station;
   adjusting transmission timing for the first antenna and the second antenna based on the TA values; and
   transmitting the control information to the second RU by using the second antenna at the adjusted transmission timing when the uplink subframe according to the second uplink-downlink configuration comes earlier than a uplink subframe according to the first uplink-downlink configuration after the reception of the downlink signal.

5. The method of claim 1, wherein the transmitting includes transmitting a rank indicator (RI) as the control information corresponding to the downlink signal to the second RU by using the second antenna.

6. The method of claim 1, wherein the transmitting includes transmitting a channel quality indication (CQI) as the control information corresponding to the downlink signal to the second RU by using the second antenna.

7. The method of claim 1, wherein the transmitting includes transmitting a pre-coding matrix indicator (PMI) corresponding to the downlink signal to the second RU by using the second antenna.

8. A high speed moving terminal including a first antenna and a second antenna, the high speed moving terminal comprising:
- a first antenna communicating with a first radio unit (RU) of a base station based on a first uplink-downlink configuration;
- a second antenna communicating with a second RU of a base station based on a second uplink-downlink configuration;
- a first signal processor connected to the first antenna;
- a second signal processor connected to the second antenna; and
- a controller configured to:
  - receive a first downlink signal from the first RU and a second downlink signal from the second RU; and
  - transmit first control information corresponding to the first downlink signal to the second RU by using the second antenna through a uplink subframe according to the second uplink-downlink configuration and second control information corresponding to the second downlink signal to the first RU by using the first antenna through a uplink subframe according to the first uplink-downlink configuration,
  - wherein a number of uplink subframes included in the second uplink-downlink configuration is different from a number of uplink subframes included in the first uplink-downlink configuration.

9. The high speed moving terminal of claim 8, wherein the controller is further configured to:
- receive a pilot signal from the second RU by using the second antenna through at least one resource element included in a downlink subframe based on the second uplink-downlink configuration; and
- transmit no uplink signal by using the first antenna through at least one resource element included in the uplink subframe when the at least one resource element included in the uplink subframe overlaps, on time and frequency domain, with a resource element of the downlink subframe carrying the pilot signal.

10. The high speed moving terminal of claim 8, wherein the controller is further configured to:
- adjust transmission timing by a first timing advance (TA) for the first antenna and adjust transmission timing by a second TA for the second antenna, and
- transmit the first control information to the second RU by using the second antenna at the adjusted transmission timing when the uplink subframe according to the second uplink-downlink configuration comes earlier than a uplink subframe according to the first uplink-downlink configuration after the reception of the downlink signal.

11. A method for receiving control information at a base station of a mobile wireless backhaul network where a first radio unit (RU) and a second RU are distributedly installed, the method comprising:
- communicating with a first antenna of a high speed moving terminal by using the first RU based on a first uplink-downlink configuration, and communicating with a second antenna of the high speed moving terminal by using the second RU based on a second uplink-downlink configuration which is different from the first uplink-downlink configuration;
- transmitting a downlink signal to the first antenna of the high speed moving terminal by using the first RU; and
- receiving control information corresponding to the downlink signal from the second antenna of the high speed moving terminal by using the second RU through an uplink subframe according to the second uplink-downlink configuration,
- wherein a number of uplink subframes included in the second uplink-downlink configuration is the same as a number of uplink subframes included in the first uplink-downlink configuration, and a switching point from downlink to uplink in the second uplink-downlink configuration is cyclically shifted from a switching point from downlink to uplink in the first uplink-downlink configuration by a predetermined number of subframes.

12. The method of claim 11, further comprising:
- removing an interference signal corresponding to the downlink signal being transmitted by using the first RU from an uplink signal received from the second antenna when the downlink signal of the first RU and the uplink signal from the second antenna overlap with each other in a time domain; and
- demodulating the uplink signal in which the interference signal is removed.

13. The method of claim 11, further comprising:
- calculating a TA value for adjusting transmission timing for the second antenna for symbol synchronization between the uplink signal and the interference signal; and
- transmitting the TA value for adjusting the transmission timing for the second antenna to the high speed moving terminal.

14. The method of claim 11, wherein the receiving of the control information includes:
- transmitting a pilot signal to the second antenna by using the second RU through a downlink subframe based on the second uplink-downlink configuration; and
- receiving no uplink signal from the first antenna by using the first RU through at least one resource element included in the uplink subframe when the at least one resource element included in the uplink subframe overlaps, on time and frequency domain, with a resource element of the downlink subframe carrying the pilot signal so as to estimate interference channel between the first RU and the second RU.

* * * * *